US008002119B2

(12) United States Patent
Buechner et al.

(10) Patent No.: US 8,002,119 B2
(45) Date of Patent: Aug. 23, 2011

(54) CONTROL OF THE THICKENING OF SILICATE-CONTAINING AQUEOUS SYSTEMS

(75) Inventors: Karl-Heinz Buechner, Altlussheim (DE); Stephan Nied, Neustadt / Wstr. (DE); Alexander Goethlich, Mannheim (DE); Frank Klippel, Ludwigshafen (DE); Gunnar Schornick, Neuleiningen (DE)

(73) Assignee: BASF SE, Ludwigshafen (DE)

( * ) Notice: Subject to any disclaimer, the term of this patent is extended or adjusted under 35 U.S.C. 154(b) by 208 days.

(21) Appl. No.: 12/278,408

(22) PCT Filed: Jan. 30, 2007

(86) PCT No.: PCT/EP2007/050859
§ 371 (c)(1),
(2), (4) Date: Aug. 6, 2008

(87) PCT Pub. No.: WO2007/090757
PCT Pub. Date: Aug. 16, 2007

(65) Prior Publication Data
US 2009/0025896 A1    Jan. 29, 2009

(30) Foreign Application Priority Data
Feb. 8, 2006  (EP) ..................................... 06101404

(51) Int. Cl.
*B01D 39/00*  (2006.01)
(52) U.S. Cl. ......... 210/500.35; 210/500.21; 210/500.42; 162/168.1

(58) Field of Classification Search ............... 162/168.1; 252/180, 175; 510/223; 210/639, 701, 700
See application file for complete search history.

(56) References Cited

U.S. PATENT DOCUMENTS

| | | | |
|---|---|---|---|
| 3,684,779 | A | 8/1972 | Rapko |
| 4,446,028 | A | 5/1984 | Becker |
| 5,064,563 | A | 11/1991 | Yamaguchi et al. |
| 5,124,047 | A | 6/1992 | Quach et al. |
| 5,180,790 | A | 1/1993 | Rousset et al. |
| 5,300,231 | A | 4/1994 | Cha |
| 5,378,368 | A | 1/1995 | Gill |

FOREIGN PATENT DOCUMENTS

| | | |
|---|---|---|
| DE | 30 22 924 | 1/1981 |
| DE | 3233 776 | 3/1984 |
| EP | 0 459 661 | 12/1991 |
| GB | 2 054 548 | 2/1981 |
| JP | 04136287 | 5/1992 |
| WO | 2004 078662 | 9/2004 |
| WO | 2006 021308 | 3/2006 |

*Primary Examiner* — Mark Halpern
(74) *Attorney, Agent, or Firm* — Oblon, Spivak, McClelland, Maier & Neustadt, L.L.P.

(57) ABSTRACT

A method for controlling the thickening of aqueous systems comprising silicates, which comprises adding to the aqueous system at least one copolymer of a mean molecular weight Mw of at least 3000 g/mol to at most 60 000 g/mol and the copolymer being made up essentially randomly from monoethylenically unsaturated monocarboxylic acids, monoethylenically unsaturated dicarboxylic acids and other ethylenically unsaturated comonomers, the polymerization for producing the copolymer being performed in the presence of from 0.01 to 100 mol % of at least one base, based on the total amount of all COOH groups of the monocarboxylic and dicarboxylic acids, the quantitative figures in % by weight being respectively based on the total amount of all monomers used.

20 Claims, No Drawings

CONTROL OF THE THICKENING OF SILICATE-CONTAINING AQUEOUS SYSTEMS

This application is a 371 of PCT/EP2007/050859 filed on Jan. 30, 2007

The present invention relates to a method for controlling the thickening of aqueous systems which comprise silicates using at least one copolymer. The invention further relates to thickened aqueous systems which comprise copolymers, and also to the uses of the thickened aqueous systems. Further embodiments of the present invention may be taken from the claims, the description and the examples. Clearly, the features mentioned above and which are still to be described hereinafter of the inventive subject matter are usable not only in the combination concretely stated in each case, but also in other combinations, without leaving the context of the invention.

In many industrial processes, concentrating dissolved components in aqueous systems is of importance. This concentrating is termed thickening. Frequently, the efficient and safe operation of industrial plants is only ensured if the thickening can be controlled within a predefined range. The aqueous system, for example cooling water, is frequently used repeatedly. For this, measures must be taken which ensure stable operation of the plants with a circulation as high as possible. The thickening is usually controlled by a combination of technical and chemical measures.

A technical measure of avoiding excessive thickening is replenishing water to the thickened aqueous system. The replenished water is termed additional water. A frequently occurring permanent trend to thickening and the resultant necessary feed of additional water continuously increases the thickening in the aqueous system via components present in the additional water. A sufficient amount of the thickened aqueous system which has been concentrated up to the technically possible limit is discarded and exchanged for unthickened additional water until the system is below the maximum technically permitted thickening limit.

This maximum permitted limit significantly depends on the type and amount of dissolved components present in the additional water. Additional water having only low amounts of dissolved components generally permits greater thickening, and vice versa. "Thickening-limiting" factors are not only components which can trigger encrustations and deposits, but also corrosion-triggering/corrosion-reinforcing components. In this context, the carbonate hardness present in the aqueous system (deposit-forming) and the chloride content present in the aqueous system (triggering/reinforcing corrosion processes) may be mentioned.

Chemical water treatment methods for controlling the carbonate and chloride content are known to those skilled in the art. For example, carbonate and chloride contents may be reduced by ion exchangers. The formation of slightly soluble precipitates from carbonate ions and polyvalent cations, such as magnesium or calcium ions, may be suppressed by sediment-inhibiting compounds. As is known to those skilled in the art, these compounds are frequently polyacrylates/polyacrylic acids or copolymers of acrylic acid and maleic acid, or complexing agents for polyvalent cations such as EDTA. However, after carbonate and chloride contents have been controlled, other components of the water frequently come into the focus of chemical water treatment, which components may be controlled only inadequately using known compounds. Sulfates, phosphates, fluorides, oxalates and, especially, silicates also, can, depending on the technical design of the plants, be thickening-limiting and causes of problems.

Controlling the thickening in aqueous systems which comprise silicates frequently proves difficult, despite the known chemical water treatment methods.

Substances which prevent deposits of silicates, and their production methods, are known in principle.

WO 04/78662 discloses a method for preventing silicate deposits in aqueous systems using linear phosphorus-comprising copolymers and oligomers which have phosphorus groups at the ends of the molecule.

EP 0 459 661 A1 discloses a method for preventing silicate deposits in aqueous systems using (meth)acrylic acid- or maleic acid-comprising copolymers having a mean molecular weight Mw (weight average) in the range from 1000 to 25 000 g/mol. As a further method for preventing silicate deposits in the cooling water, the use of polyacrylic acids or polymaleic acids having an Mw of 1000 to 25 000 g/mol in combination with aluminum or magnesium ions is described.

U.S. Pat. No. 3,684,779 A1 discloses copolymers of maleic acid, acrylic acid and alkenyl phosphonate monomers, and also derivatives of the individual monomers. The molecular weights of the polymers, determined by measuring the intrinsic viscosity, range from 5000 to 50 000. Prevention of deposits of slightly soluble salts is mentioned in the description.

U.S. Pat. No. 5,124,047 A1 discloses a method for preventing deposits in aqueous systems using copolymers which comprise allyl phosphonate monomers. The copolymers have Mw values from the range of 500 to 1 000 000 g/mol.

It was an object of the invention to provide an improved method for controlling the thickening of aqueous systems, in particular those which comprise silicates. A purpose was to find a method of this type which enables the control of thickening in a preset range. A further object of the invention was to increase the stability of thickened aqueous systems against the precipitation of dissolved salts, impurities and particles which lead to deposits and encrustations. An additional object of the invention was to enable savings in additional water with simultaneous protection and high availability of the technical systems. Further partial objects of the invention were control of biological growth in the aqueous systems, the use of as little as possible biocides or anticorrosive agents with the same efficiency, and the mobilization (dispersion) of sludges and silt in the aqueous system. In addition, the intention was to keep the thickening in the technically required range over a long period. In addition, controlling the thickening of aqueous systems was to be possible via inexpensive and environmentally compatible measures of chemical water treatment. In particular the copolymers used were to have low residual monomer contents.

Accordingly, a method has been found for controlling the thickening of aqueous systems which comprise silicates, in which, by addition of at least one copolymer having a mean molecular weight Mw (weight average) of at least 3000 g/mol to at most 60 000 g/mol, control of thickening in a preset range is possible. The copolymers used in the inventive method are essentially made up randomly from the following monomeric units:

(A) 20 to 99.98% by weight of at least one monoethylenically unsaturated monocarboxylic acid, (B) 0.01 to 70% by weight of at least one monoethylenically unsaturated dicarboxylic acid of the general formula

(I), and/or

(II), or the corresponding carboxylic anhydrides and/or other hydrolyzable derivatives, $R^1$ and $R^2$ independently of one another being H or a straight-chain or branched, optionally substituted, alkyl radical having 1 to 20 carbon atoms, or in the case of (I), $R^1$ and $R^2$ together being an optionally substituted alkylene radical having 3 to 20 carbon atoms, and n being an integer from 0 to 5, and also (C) 0.01 to 40% by weight of at least one further ethylenically unsaturated comonomer different from (A) and (B), the polymerization to produce the copolymer being performed in the presence of 0.01 to 100 mol % of at least one base, based on the total amount of all COOH groups of the mono- and dicarboxylic acids, and the quantities in % by weight given in each case being based on the total amount of all monomers used.

The term "polymerization" designates hereinafter the polymerization of the monomers (A), (B) and (C) for producing the copolymer.

The structure and the production of the copolymers which are used in the inventive method are analogous to the structure and production of closely related copolymers described in the still unpublished application DE 102004041127.1, which is explicitly incorporated herein by reference.

The aqueous system comprises, in addition to water, at least one substance dissolved in water. The dissolved substance or the dissolved substances can either be dissolved in molecular form or with the formation of ions or else be present in dispersed or emulsified form. In particular, the aqueous system comprises silicates. The aqueous systems can, in addition to silicates, frequently comprise anions, for example carbonates, chlorides, sulfates, phosphates, fluorides, oxalates and polyvalent cations. The aqueous systems can comprise not only monovalent but also polyvalent cations. The polyvalent cations are usually ions of the elements: Ca, Mg, Fe, Cu, Co, Al, Zn, Mn, Ba, Sr, Mo, Ce, Zr or, in particular, ions of Ca or Mg. In addition, mixtures of the abovementioned ions are frequently encountered. The aqueous system, in addition to the main component water, can also comprise fractions of water-miscible organic solvents.

Silicates exist, depending on the conditions in the aqueous system, as variously slightly soluble compounds. At pHs below 7, silicates have a tendency toward condensation and form oligomers or colloidal silicates. In the pH range above 9.5, the monomeric silicate ion forms. The conversion between the various forms of silicates is frequently kinetically inhibited and different forms of silicates can exist in aqueous solution in parallel to one another. The various silicate ions can react with polyvalent cations to form slightly soluble salts. The composition of aqueous silicate-comprising solutions is greatly dependent on the prehistory of the system. However, frequently monomeric, oligomeric and colloidal silicate exist together with one another, and also magnesium and calcium silicates and other silicate salts. These systems are termed here aqueous systems which comprise silicates. The term "silicates" is used as a representative for silicates (salt or anion) or silicic acids.

Surprisingly, it has been found that the inventive method permits effective control of the thickening of aqueous systems which comprise silicates using the above-described copolymers. Obviously, the copolymers used in the inventive method, in principle can also in aqueous systems which do not comprise silicates, permit effective control of thickening.

The molecular weight Mw of the copolymers added in the inventive method is preferably in the range from 3000 g/mol to 60 000 g/mol. It can be, for example, from 5000 g/mol to 60 000 g/mol. Thus Mw can be, for example, in the range from 5000 g/mol to 55 000 g/mol, for example from 7000 g/mol to 55 000 g/mol. In particular, Mw can be from 7000 g/mol to 50 000 g/mol. According to one of the preferred embodiments the molecular weight is at least 10 000 to 50 000 g/mol. The Mw values are determined by means of gel-permeation chromatography (GPC). The GPC is calibrated using a broadly distributed Na-PAA mixture (Na-PAA: sodium salt of polyacrylic acid), the integral molecular weight distribution curve of which is determined by SEC/coupled laser light scattering (SEC: Size Exclusion Chromatography), by the calibration method of M. J. R. Cantow et al. (J. Polym. Sci., A-1, 5 (1967)1391-1394), but without the concentration correction proposed there. The molecular weight of the copolymers is set by those skilled in the art in accordance with the desired application.

The copolymers used in the inventive method are made up of units which are derived from monoethylenically unsaturated monocarboxylic (A) and dicarboxylic acids (B) and additionally, to a lower proportion, from other monoethylenically unsaturated monomers (C).

The term "copolymer" is used in different ways in the specialist literature and in the context of this invention designates polymers having three or more different monomer types, in particular also terpolymers made up of three monomer types. Preferably, in the inventive method, carboxylate-rich copolymers are used. Carboxylate-rich copolymers are copolymers which comprise monoethylenically unsaturated monocarboxylic and dicarboxylic acids, and optionally to a lower proportion, monoethylenically unsaturated monomers (C).

The monomer (A) is at least one monoethylenically unsaturated monocarboxylic acid or hydrolyzable derivatives thereof. Of course, mixtures of a plurality of different ethylenically unsaturated monocarboxylic acids can also be used. Preferably, the monomer (A) is a monoethylenically unsaturated monocarboxylic acid.

Examples of suitable monoethylenically unsaturated monocarboxylic acids (A) comprise acrylic acid, methacrylic acid, crotonic acid, vinylacetic acid or else C1-C4-half esters of monoethylenically unsaturated dicarboxylic acids. The expression Ca-Cb, in the context of this invention, designates chemical compounds having a defined number of carbon atoms. The number of carbon atoms can be selected from the entire range from a to b, including a and b, a is at least 1 and b is always greater than a. The chemical compounds are made more specific by expressions of the form Ca-Cb-V. V in this case is a chemical class of compounds or class of substituents, for example alkyl compounds or alkyl substituents.

Preferred monomers (A) are acrylic acid and methacrylic acid, particularly preferably acrylic acid.

From 20 to 99.98% by weight of the monomer (A) is used, the quantitative figure relating to the total amount of all monomers used for the polymerization. Preferably, use is made of from 30 to 90% by weight of monomer (A), particularly preferably from 30 to 85% by weight, and very particularly preferably from 35 to 80% by weight.

The monomer (B) is at least one monoethylenically unsaturated dicarboxylic acid of the general formula (HOOC)$R^1C$=$CR^2$(COOH) (I) or $R^1R^2C$=$C(-(CH_2)_n-COOH)$(COOH) (II).

Use can also be made of mixtures of a plurality of different monomers (B). In the case of (I), these can be in each case the cis form and/or the trans form of the monomer. The monomers can also be used in the form of the corresponding carboxylic anhydrides or other hydrolyzable carboxylic acid derivatives. If the COOH groups are arranged in the cis position, particularly advantageously, cyclic anhydrides can be used.

$R^1$ and $R^2$ are independently of one another H or a straight chain or branched, optionally substituted alkyl radical having 1 to 20 carbon atoms. Preference can be given here to the radicals $R^1$ or $R^2$ being relatively long-chain alcohols and having, for example, ten or more carbon atoms. According to a preferred embodiment, the alkyl radical is relatively short chain. Preferably, the alkyl radical has 1 to 4 carbon atoms. Particularly preferably, $R^1$ or $R^2$ is H and/or a methyl group. The alkyl radical itself can also optionally further have one or more substituents, provided that these do not have an adverse influence on the service properties of the copolymer in the inventive method.

In the case of formula (I), $R^1$ and $R^2$ can in addition together be an alkylene radical having 3 to 20 carbon atoms which can also optionally be further substituted. Preferably, the ring formed from the double bond and the alkylene radical comprises 5 or 6 carbon atoms. Examples of alkylene radicals comprise, in particular, a 1,3-propylene radical or a 1,4-butylene radical which can also have further alkyl groups as substituents. n is an integer from 0 to 5, preferably from 0 to 3, and very particularly preferably 0 or 1.

Examples of suitable monomers (B) of the formula (I) comprise maleic acid, fumaric acid, methylfumaric acid, methylmaleic acid, dimethylmaleic acid and also if appropriate the corresponding cyclic anhydrides. Examples of formula (II) comprise methylenemalonic acid and itaconic acid. Preferably, use is made of maleic acid or maleic anhydride or itaconic acid or itaconic anhydride. Use can also be made of mixtures of maleic acid or maleic anhydride, respectively, with itaconic acid or itaconic anhydride, respectively.

From 0.01 to 70% by weight of monomers (B) are used, the quantitative proportion being based on the total amount of all monomers used for the polymerization. Preferably, use is made of 1 to 60% by weight of monomer (B), particularly preferably from 5 to 55% by weight, and very particularly preferably from 10 to 45% by weight.

In addition to the monomers (A) and (B), use can be made of one ethylenically unsaturated monomer (C) or a plurality of ethylenically unsaturated monomers (C).

Furthermore, no other monomers are used.

The monomers (C) serve for fine control of the properties of the copolymer. Obviously, use can also be made of a plurality of different monomers (C). They are selected by those skilled in the art according to the desired properties of the copolymer. The monomers (C) are likewise polymerizable by free-radical means.

In particular cases, however, use can also be made of small amounts of monomers having a plurality of polymerizable groups. By this means, the copolymer can be crosslinked to a small extent.

The monomers (C) can be not only acidic or basic or neutral monomers, but also mixtures of these monomers. Preferably they are neutral monomers or acidic monomers or mixtures of neutral and acidic monomers.

Examples of suitable monomers (C) comprise, in particular, monomers which have phosphoric acid or phosphonic acid groups. In particular vinylphosphonic acid may be mentioned here. In addition, use can be made of 3-butenylphosphonic acid. Further preferred monomers are dimethyl vinylphosphonate, phosphonooxyethyl acrylate or phosphonooxyethyl methacrylate. Allylphosphonic acid can be an, albeit non-preferred, monomer (C). Further examples comprise esters of phosphoric acid, such as monovinyl phosphate, monoallyl phosphate. Mono-3-butenyl phosphate, mono-(4-vinyloxybutyl) phosphate, mono-(2-hydroxy-3-vinyloxypropyl) phosphate, mono-(1-phosphonooxymethyl-2-vinyloxyethyl) phosphate, mono-(3-allyloxy-2-hydroxypropyl) phosphate, or mono-2-(allyloxy-1-phosphonooxymethylethyl) phosphate. Further examples of suitable monomers (C) are 2-hydroxy-4-vinyloxymethyl-1,3,2-dioxaphosphole or 2-hydroxy-4-allyloxymethyl-1,3,2-dioxaphosphole. Use can also be made of salts or esters or mixtures of salts and esters, in particular $C_1$-$C_8$-mono-, di- or trialkylesters of phosphoric acid or phosphonic acid group-comprising monomers. Of course, use can also be made of mixtures of the abovementioned monomers. Particular preference is given to vinylphosphonic acid and salts and/or esters thereof.

In addition, suitable monomers are sulfonic acid group-comprising monomers such as methallylsulfonic acid, styrenesulfonate, allyloxybenzenesulfonic acid, or 2-(methylacryloyl)ethylsulfonic acid or their salts and/or esters. Preferably use is made of allylsulfonic acid, vinylsulfonic acid, 2-acrylamido-2-methylpropanesulfonic acid or their salts and/or esters.

Further acidic monomers comprise, e.g., maleic acid halfamides.

Examples of essentially neutral monomers (C) comprise, provided that they have not already been used as monomer (A), $C_1$- to $C_{18}$-alkylesters or $C_1$- to $C_4$-hydroxy-alkylesters of (meth)acrylic acid, such as methyl (meth)acrylate, ethyl (meth)acrylate, propyl (meth)acrylate, isopropyl (meth)acrylate, butyl (meth)acrylate, hexyl (meth)acrylate, 2-ethylhexyl (meth)acrylate, hydroxyethyl (meth)acrylate, hydroxypropyl (meth)acrylate, or butanediol 1,4-monoacrylate. Further neutral monomers are (methyl)styrene, maleimide or maleic acid N-alkylimide.

Also suitable are vinyl or allyl ethers such as, for example, methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether or methyl diglycol vinyl ether or the corresponding allyl compounds. Likewise use can be made of vinyl esters, for example vinyl acetate or vinyl propionate.

Examples of basic monomers comprise acrylamides and alkyl-substituted acrylamides, such as, for example, acrylamide, methacrylamide, N-tert-butylacrylamide or N-methyl (meth)acrylamide.

Use can also be made of alkoxylated monomers, in particular ethoxylated monomers.

Those which are suitable in particular are alkoxylated monomers which are derived from acrylic acid or methacrylic acid and which have the general formula (III)

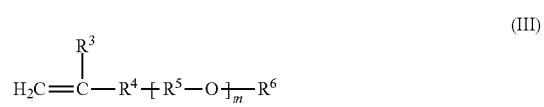

(III)

where the variables have the following meaning:
$R^3$ hydrogen or methyl;
$R^4$—$(CH_2)_x$—O—, —$CH_2$—$NR^7$—, —$CH_2$—O—$CH_2$—$CR^8R^9$—$CH_2$—O— or —CONH—; COO— (ester)
$R^5$ identical or different $C_2$-$C_4$-alkylene radicals which can be arranged blockwise or randomly, the fraction of ethylene radicals being at least 50 mol %;
$R^6$ hydrogen, $C_1$-$C_4$-alkyl, —$SO_3M$ or —$PO_3M_2$;
$R^7$ hydrogen —$CH_2$—$CR^1$=$CH_2$;
$R^8$—O—[$R^5$—O]$_n$—$R^6$, the radicals —[$R^5$—O]$_n$— being able to differ from the further radicals —[$R^5$—O]$_n$— present in formula I;

$R^7$ hydrogen or ethyl;

M alkali metal or hydrogen, preferably hydrogen, m 1 to 250, preferably 2 to 50, particularly preferably 3 to 10;

x 0 or 1.

Examples of crosslinking monomers comprise molecules having a plurality of ethylenically unsaturated groups, for example di(meth)acrylates such as ethylene glycol di(meth)acrylate or butanediol-1,4-di(meth)acrylate or poly(meth)acrylates such as trimethylolpropanetri(meth)acrylate or else di(meth)acrylates of oligo- or polyalkylene glycols such as di-, tri- or tetraethylene glycol di(meth)acrylate. Further examples comprise vinyl (meth)acrylate or butanediol divinyl ether.

Those skilled in the art will make a suitable selection among the monomers (C) according to the desired properties of the copolymer and also to the desired use of the copolymer. For example, in the method for stabilizing silicate-comprising thickened aqueous systems, as monomer (C), use is preferably made of phosphonic acid- or phosphoric acid-comprising monomers, in particular vinylphosphonic acid or their hydrolyzable derivatives.

The amount of the monomers (C) is 0.01 to 40% by weight, based on the total amount of all monomers used for the polymerization. According to one of the embodiments, the amount is preferably 0.01 to 30% by weight. According to another preferred embodiment, the amount is from 0.1 to 27%, and very particularly preferably from 1 to 20% by weight. If crosslinking monomers (C) are present, their amount should generally not exceed 5% by weight, preferably 2% by weight, based on the total amount of all monomers used for the method.

A surprisingly high performance has been found for copolymers acrylic acid (A), itaconic acid (B) and vinylphosphonic acid (C) or acrylic acid (A), maleic acid (B) and vinylphosphonic acid (C). For use in the inventive method, suitable copolymers are for example copolymers made of 20 to 99.98% by weight of acrylic acid (A) and from 0.01 to 70% by weight of itaconic acid (B) and from 0.01 to 40% by weight of vinylphosphonic acid (C). Preferably suitable copolymers are made from 40 to 90% by weight of acrylic acid (A) and from 5 to 40% by weight of itaconic acid (B) and from 0.1 to 30% by weight of vinylphosphonic acid (C). Particularly preferably, suitable copolymers are made from 50 to 80% by weight of acrylic acid (A) and from 10 to 35% by weight of itaconic acid (B) and from 0.5 to 25% by weight of vinylphosphonic acid (C). Very particularly preferably, suitable copolymers are made from 55 to 75% by weight of acrylic acid (A) and from 15 to 30% by weight of itaconic acid (B) and from 1 to 20% by weight of vinylphosphonic acid (C).

In addition, suitable copolymers are made from 20 to 99.98% by weight of acrylic acid (A) and from 0.01 to 70% by weight of maleic acid (B) and from 0.01 to 40% by weight of vinylphosphonic acid (C). Preferably, suitable copolymers are made from 40 to 90% by weight of acrylic acid (A) and from 5 to 40% by weight of maleic acid (B) and from 0.1 to 30% by weight of vinylphosphonic acid (C). Particularly preferably, suitable copolymers are made from 50 to 80% by weight of acrylic acid (A) and from 10 to 35% by weight of maleic acid (B) and from 0.5 to 25% by weight of vinylphosphonic acid (C). Very particularly preferably, suitable copolymers are made from 55 to 75% by weight of acrylic acid (A) and from 15 to 30% by weight of maleic acid (B) and from 1 to 20% by weight of vinylphosphonic acid (C).

The total amount of monomers (A), (B) and (C) used makes up 100% by weight.

The copolymers used in the inventive method are preferably obtained from the monomers by free-radical polymerization in aqueous solution. The microstructure of the copolymers is given by a random distribution of the monomers.

The term "aqueous solution" in the context of free-radical polymerization means that the solvent or diluent used in the production of the copolymers has water as main component. In addition, however, further fractions of water-miscible organic solvents can also be present in the polymerization and also if appropriate small amounts of emulsifiers. This can be advantageous to improve the solubility of certain nonomers, in particular the monomer (C), in the reaction medium.

The solvent or diluent used in the free-radical polymerization correspondingly has at least 50% by weight of water based on the total amount of solvent. In addition, one or more water-miscible solvents can be used. Those which may be mentioned here are, in particular, alcohols, for example monoalcohols such as ethanol, propanol or isopropanol, dialcohols such as glycol, diethylene glycol or polyalkylene glycols or derivatives thereof. Preferred alcohols are propanol and isopropanol. Preferably, the water fraction is at least 70% by weight, further preferably at least 80% by weight, particularly preferably at least 90% by weight. Very particularly preferably, water is used alone.

The amount of the monomers used in each case is selected by those skilled in the art in such a manner that the monomers are soluble in the solvent or diluent respectively used. More poorly soluble monomers are accordingly used by those skilled in the art only in the amount in which they may be dissolved. If appropriate, to increase the solubility, small amounts of emulsifiers can be added.

The polymerization is performed in the presence of a base, for example of alkali metal hydroxides, such as NaOH or KOH, alkaline earth metal hydroxides, NH3 or organic amines. Likewise, compounds can be used which react in the reaction medium to form a base. Examples could be alkali metal oxides or alkaline earth metal oxides. In addition, N heterocycles can also be used.

In particular, the polymerization is performed in the presence of an organic amine. "Organic amines" are termed amines hereinafter. The content of base is generally from 0.01 to 100 mol %, for example from 1 to 80 mol %, or from 1 to 50 mol %, in particular from 2 to 19.9 mol %. Preferably, operations are performed in the range from 3 to 15 mol %, and particularly preferably from 5 to 10 mol %. The above quantitative figures in mol % relate to the total amount of all COOH groups of the monocarboxylic acid (A) and the dicarboxylic acids (B) in the copolymer. Other acid groups present if appropriate are not taken into consideration. In other words, the COOH groups are therefore partly neutralized. Of course, a mixture of two or more bases can also be used.

The amines used as base can have one or more primary and/or secondary and/or tertiary amino groups and also the corresponding number of organic groups. The organic groups can be alkyl, aralkyl, aryl or alkylaryl groups. Preferably, they are straight-chain or branched alkyl groups. They can, in addition, have further functional groups. Functional groups of this type are preferably OH groups and/or ether groups. Use can also be made of amines which are not readily water-soluble per se, because in contact with the acidic monomers the water solubility is advantageously increased by formation of ammonium ions. The amines can also be ethoxylated.

Examples of suitable amines comprise linear, cyclic and/or branched $C_1$-$C_8$-mono-, di- and trialkylamines, linear or branched $C_1$-$C_8$-mono-, di- or trialkanolamines, in particular mono-, di- or trialkanolamines, linear or branched $C_1$-$C_8$-alkyl ethers of linear or branched $C_1$-$C_8$-mono-, di- or trialkanolamines, oligo- and polyamines, for example diethylenetriamine.

The amines can also be heterocyclic amines, for example morpholine, piperazine, imidazole, pyrazole, triazoles, tetrazoles, piperidine. Particularly advantageously, use can be made of those heterocycles which have anti-corrosion properties. Examples comprise benztriazole and/or tolyltriazole.

In addition, use can also be made of amines which have ethylenically unsaturated groups, in particular monoethylenic amines. Such amines can carry out a double function as amine for the neutralization and also as monomer (C). For example, use can be made of allylamine.

Those skilled in the art make a suitable selection among the amines.

Preference is given to amines having only one amino group. Further preference is given to linear or branched $C_1$-$C_8$-mono-, di- or trialkanolamines, particular preference is given to mono-, di- and triethanolamine and/or the corresponding ethoxylated products. Very particular preference is given to N,N-dimethylethanolamine, N,N-diethylethanolamine and triethanolamine.

Preferably, the amount of the amine used is from 0.1 to 100 mol %, for example from 1 to 80 mol % or from 1 to 50 mol %, in particular from 2 to 19.9 mol %. Preferably the range from 3 to 15, and particularly preferably from 5 to 10 mol %, is employed. The abovementioned quantitative figures in mol % relate to the total amount of all COOH groups of the monocarboxylic acids (A) and the dicarboxylic acids (B) in the copolymer.

The base, for example the amine, can be added before or during the polymerization. Preferably, it is already added before, or at the latest at the start of, polymerization. The base, such as amine, can either be added all at once or in a time interval which corresponds at most to the total reaction time. The base, for example the amine, can in this case be admixed to the monomer feed, either the monocarboxylic acid, the dicarboxylic acid or both, and added together with these. In other words, the carboxylic acids can therefore be added in part in the form of the corresponding ammonium salts. Preferably, the base, for example the amine, is added directly in a receiver. To carry out the polymerization, it has proven useful in this case to charge initially the dicarboxylic acid or, if appropriate, its cyclic anhydride, and thereafter to add the base, such as amine, still before further monomers and/or initiator are added, without the production of the polymers used in the inventive method being intended to be thereby fixed to this procedure.

Monoethylenically unsaturated dicarboxylic acids react in the course of the free-radical polymerization customarily markedly more inertly than monocarboxylic acids. Therefore copolymers made of monoethyenically unsaturated monocarboxylic and dicarboxylic acids frequently still comprise greater or lesser amounts of non-polymerized dicarboxylic acids. High residual contents of dicarboxylic acids are undesirable for many applications, since, for example, free residual dicarboxylic acid can be leached out again.

Theoretically, there is the possibility of post-purification of the polymers. However, this is laborious and uneconomic. It is known to those skilled in the art to neutralize the COOH groups of the monomers used in the course of the polymerization in whole or in part with bases. By this means the amount of non-polymerized dicarboxylic acid may be decreased. Surprisingly, it has been found that by using amines as base, in the range from 2 to 19.9 mol %, based on the total amount of all COOH groups in the monocarboxylic and dicarboxylic acid units, copolymers are obtainable which have a low degree of neutralization, but nevertheless have a likewise low residual content of non-polymerized dicarboxylic acid. Copolymers may be obtained having a very high content of polymerized dicarboxylic acids.

The polymerization, even with the use of relatively small amounts of amines as base, nevertheless leads to copolymers which have only low amounts of non-polymerized dicarboxylic acids.

The residual content of non-polymerized dicarboxylic acids in the product when amines are used is in the range from 2 to 19.9 mol %, based on the total amount of all COOH groups in the monocarboxylic and dicarboxylic acid units, lower than when other bases such as NH3 or NaOH are used.

The residual content, even in the case of copolymers having higher contents of dicarboxylic acids, is, generally, no more than 2.5% by weight with respect to the copolymer.

The residual content of monocarboxylic acids (A) is likewise very low, it is generally no more than 0.1% by weight, with respect to the copolymer.

Generally, the copolymers have, by using a base, such as an amine, during the polymerization, a degree of neutralization of carboxyl groups of all mono- and dicarboxylic acid units from 0.01 to 100 mol % with respect to the total amount of all carboxyl groups (COOH groups) in the monocarboxylic and dicarboxylic acid units. Generally, the degree of neutralization is simply given from the amount of the base originally added, for example the amine. Depending on the type of base, such as amine, for example, in particular its volatility and basicity, however even small amounts of base, for example amine, can be lost in the course of polymerization and/or workup. When basic monomers (C) are used, the degree of neutralization, in some circumstances, can also be higher than given by the amount of base, for example amine. The amines are generally present in the product as ammonium ions. Depending on the basicity of the amine, however, certain amounts of the amine can be present in the product in unprotonated form.

The free-radical polymerization is preferably started by the use of suitable thermally activatable polymerization initiators. However, it can alternatively also be initiated, for example by suitable irradiation. The free-radical initiators should be soluble in the solvent of the reaction, preferably water-soluble.

Among the thermally activatable polymerization initiators, preference is given to initiators having a decomposition temperature in the range from 30 to 150° C., in particular from 50 to 130° C. This temperature figure is based as is customary on a 10 h half life. Examples of suitable thermal initiators are inorganic peroxo compounds, such as peroxodisulfates, in particular ammonium and preferably sodium peroxodisulfate, peroxosulfates, percarbonates and hydrogen peroxide; organic peroxo compounds, such as diacetyl peroxide, di-tert-butyl peroxide, diamyl peroxide, dioctanoyl peroxide, didecanoyl peroxide, dilauroyl peroxide, dibenzoyl peroxide, bis(o-toloyl) peroxide, succinyl peroxide, tert-butyl peracetate, tert-butyl permaleate, tert-butyl perisobutyrate, tert-butyl perpivalate, tert-butyl peroctoate, tert-butyl perneodecanoate, tert-butyl perbenzoate, tert-butyl peroxide, tert-butyl hydroperoxide, cumene hydroperoxide, tert-butyl peroxy-2-ethylhexanoate and diisopropyl peroxydicarbamate; azo compounds, such as 2,2'-azobisisobutyronitrile, 2,2'-azobis (2-methylbutyronitrile), azobis(2-amidopropane) dihydrochloride, and azo(bisisobutylamidine) dihydrochloride. Further suitable azo compounds which are soluble in organic solvents are 2,2'-azobis(4-methoxy-2,4-dimethylvaleronitrile), dimethyl 2,2'-azobis(2-methylpropionate), 1,1'-azobis (cyclohexane-1-carbonitrile), 1-[(cyano-1-methylethyl)azo] formamide, 2,2'-azobis(N-cyclohexyl-2-methylpropionamide), 2,2'-azobis(2,4- dimethylvaleronitrile), 2,2'-azobis[N-(2-propenyl)-2-methylpropionamide], 2,2'-azobis(N-butyl-2-methylpropionamide). Preferably, use is made of water-soluble compounds such as, for example, 2,2'-azobis-[2-(5-methyl-2-imidazolin-2-yl)propane]dihydrochloride, 2,2'-azobis[2-(2-imidazolin-2-yl)propane disulfate dihydrate, 2,2'-azobis[N-(2-carboxyethyl)-2-methylpropionamidine] tetrahydrate, 2,2'-azobis{2-[1-(2-hydroxyethyl)-2-imidazolin-2-yl]propane}dihydrochloride, 2,2'-azobis[2-methyl-N-[1,1-bis(hydroxymethyl)-2-hydroxyethyl]propionamide, 2,2'-azobis[2-methyl-N-(2-hydroxyethyl)propionamide], 2,2'-azobis[2-(2-imidazolin-2-yl)propane]dihydrochloride, 2,2'-azobis(2-methylpropionamide) dihydrochloride, 2,2'-azobis[2-(3,4,5,6-tetrahydropyrimidin-2-yl)propane]dihydrochloride, 2,2'-azobis[2-(2-imidazolin-2-yl)propane], 2,2'-azobis[2-methyl-N-[2-(1-hydroxybutyl)]propionamide.

Particular preference is given to sodium peroxodisulfate, hydrogen peroxide, 2,2'-azobis(2-methylpropionamide) dihydrochloride. Use can also be made of mixtures of the initiators.

These initiators can be used in combination with reducing compounds as starter/controller systems. Examples of such reducing compounds which may be mentioned are phosphorus-comprising compounds such as phosphorous acid, hypophosphites and phosphinates, and sulfur-comprising compounds, such as sodium hydrogensulfite, sodium sulfite and sodium formaldehyde sulfoxylate.

In combination with the initiators or the redox initiator systems, in addition use can be made of transition metal catalysts, e.g. salts of iron, cobalt, nickel, copper, vanadium and manganese. Suitable salts are, for example, iron(II) sulfate, cobalt(II) chloride, nickel(II) sulfate, copper(I) chloride. The reducing transition metal salt is customarily used in an amount of 0.1 to 1000 ppm, based on the sum of the monomers. Particularly advantageous are, for example, combinations of hydrogen peroxide and iron(II) salts, such as a combination of 0.5 to 30% by weight of hydrogen peroxide and 0.1 to 500 ppm of $FeSO_4.7H_2O$, in each case based on the sum of the monomers. Likewise preferred are combinations of sodium peroxodisulfate with $FeSO_4.7H_2O$ or a mixture of sodium peroxodisulfate and hydrogen peroxide with $FeSO_4.7H_2O$. Preferably, use is made of from 1 to 450 ppm, particularly preferably from 10 to 400 ppm, of $FeSO_4.7H_2O$.

Examples of suitable photoinitiators comprise acetophenone, benzoin ethers, benzyl dialkyl ketones and derivatives thereof.

Preferably, use is made of thermal initiators, inorganic peroxo compounds, in particular hydrogen peroxide, and especially sodium peroxodisulfate, and also mixtures of hydrogen peroxide and sodium peroxidisulfate being preferred. Very particular preference is given to the mixture of hydrogen peroxide and sodium peroxodisulfate.

Of course, mixtures of different initiators can also be used, provided that they do not adversely affect each other. The amount is established by those skilled in the art depending on the desired copolymer. As a rule, use is made of from 0.05% by weight to 30% by weight, preferably from 0.1 to 15% by weight, and particularly preferably from 0.2 to 8% by weight, of the initiator with respect to the total amount of all monomers.

In addition, in principle in a known manner, use can also be made of suitable controllers, for example mercaptoethanol. Preferably, no controllers are used.

By suitable choice of temperature, the molecular weight Mw of the copolymers can also be set between 3000 g/mol and 60 000 g/mol. The polymerization is generally performed at a temperature of above 60° C., for example the polymerization temperature is selected in a range from 65 to 130° C., preferably from 70 to 120° C., particularly preferably from 80 to 110° C., and in particular from 90 to 105° C.

Apart from this, the temperature can be varied by those skilled in the art within broad limits, depending on the type of monomers used, the initiator and the desired copolymer. The temperature can be kept constant during the polymerization, or temperature profiles can also be operated.

The polymerization can be performed in customary apparatuses for free-radical polymerization. If operations are carried out above the boiling temperature of water or of the mixture of water and further solvents, operations are performed in a suitable pressure vessel, otherwise they can be performed at atmospheric pressure.

In the polymerization, it has regularly proven useful to initially charge the dicarboxylic acid or corresponding anhydrides in aqueous solution. Subsequently to this, a base, such as amine, is expediently added as aqueous solution. In aqueous solution, in particular in the presence of an amine, the carboxylic anhydrides hydrolyze more or less rapidly to give the corresponding dicarboxylic acids. Thereafter the monocarboxylic acid, if appropriate further monomers (C) and also the initiator, can be added, expediently likewise in aqueous solution. Feed times from 0.5 h to 24 h, preferably from 1 h to 12 h, and particularly preferably from 2 to 8 h, have proved useful here. In this manner, the concentration of the more reactive monocarboxylic acids is kept relatively low in the aqueous solution. As a result the tendency toward reaction of the monocarboxylic acid with itself is reduced and more even incorporation of the dicarboxylic acid units into the copolymer is achieved. After the feed of all monomers, a post-reaction time, for example from 0.5 to 3 h, can further follow. This ensures that the polymerization reaction proceeds as completely as possible. Completion can also be achieved by further subsequent addition of polymerization initiator. Feed times and post-reaction time can vary over a wide range depending on the boundary conditions of the polymerization, such as, for example, the structure of the reactor.

Of course, those skilled in the art can also perform the polymerization in a different manner.

Not only carboxylic anhydrides, but also other monomers used which have hydrolyzable groups, for example esters, can hydrolyze in whole or in part under some circumstances, depending on the polymerization conditions. The copolymers then comprise the monomers having the polymerized acid group resulting from the hydrolysis, or else not only non-hydrolyzed groups, but also hydrolyzed groups simultaneously.

The synthesized copolymers can be isolated from the aqueous solution by means of customary methods known to those skilled in the art, for example by evaporating the solution, spray drying, freeze drying or precipitation.

Particularly preferably, the copolymers, after the polymerization, are not isolated at all from the aqueous solution, however, but the resultant production solutions are used as such.

As a result of the polymerization, partially neutralized, carboxylate-rich copolymers are obtainable. The composition of the copolymers essentially corresponds to the ratio of the monomers (A), (B) and also (C) are used.

If hydrolyzable derivatives of the monomers (B) were used, the copolymer, depending on the hydrolysis rate and the conditions, can also comprise fractions of non-hydrolyzed monomers.

The pH of the production solution is generally less than 5, preferably less than 4, and particularly preferably less than 3.

The copolymers used in the inventive method are soluble, or at least dispersible, in water or aqueous solvent mixtures comprising at least 50% by weight of water and copolymer solutions are obtained. It is known to those skilled in the art that the solubility of carboxylate-rich copolymers can be highly pH dependent. The term "water-dispersible" means that although the solution is not quite clear, the copolymer is homogeneously distributed therein and also does not settle out. Preference is given to copolymers which are water-soluble.

The copolymers are used according to the invention to control the thickening of aqueous systems, for example those which comprise silicates. For this, the copolymers can be used as such in various dosage forms, for example as powder, gel, granules or in tablet form. These dosage forms can comprise further aids and additives, in other words be a solid formulation. The copolymers can also, as described above, be used in the form of their production solution. In particular, the copolymers can be used as components of liquid formulations, for example as components of formulations for chemical water treatment. To produce liquid formulations, customarily the copolymers present in a solid dosage form are taken up in a solvent or diluent. Preferably, this is an aqueous solvent. If the copolymers are present in the form of their production solution, by adding further solvents or diluents, the desired formulation can be obtained. The pH of the formulations can be controlled by acid or base addition or by means of a buffer. Suitable bases for setting the pH are the bases described above in whose presence the polymerization of the copolymer is carried out. Preferably, as bases for setting the pH, use is made of NaOH, KOH or ammonia. In addition, in the formulations, corrosion inhibitors, biocides, surfactants, phosphonates, and also builders and co(builders) and also possibly other aids may also be present.

The method for controlling the thickening can in principle be applied to any desired aqueous systems, preferably those which comprise silicates, in any desired plants. Thickening in the aqueous system is characterized by what is termed the thickening factor. The thickening factor (TF) can be given, for example, by the ratio of the volumes of the aqueous system at two time points t1 and t2 (t2>t1) with a constant amount of the dissolved substances $M(t1)=M(t2)$. $TF=V(t1)/V(t2)$. If therefore, for example, the volume of the aqueous system at a defined time point t has fallen as a result of, for example, evaporation processes, to half of its initial value $V(0)$ and the amount of the dissolved substances has remained constant, this gives a $TF=V(0)/V(t)$ of 2. In the case of constant volumes, $V(t1)=V(t2)$, the TF is given by the ratio of the amounts of dissolved substances $TF=M(t2)/M(t1)$. Generally, the TF corresponds to the ratio of the concentrations of the dissolved substances at time points t1 and t2, $TF=c(t2)/c(t1)$.

Simple measurement of the TF is possible by determining the electrical conductivity in the aqueous system. The electrical conductivity of the aqueous system depends directly on the type and amount of the components dissolved in the water. The TF is given roughly by the ratio of the conductivity in the aqueous system to that in the additional water. Via measurement of the conductivity, reliable control of the thickening by the inventive method is possible. The TF can also obviously be measured by other methods, for example, samples can be taken off from the aqueous system and concentration of the dissolved substances, in particular the silicate concentration, can be determined by physical or chemical measurement methods known to those skilled in the art.

Controlling the TF in a defined preset range is performed according to the invention by corresponding addition of the copolymers or of a solid or liquid formulation which comprises the copolymers to the aqueous system. The addition can be performed either at defined time points or continuously. The first addition can be performed, for example, at a time point before the actual startup of the plant in which the aqueous system is situated. The concentration of the copolymers in the aqueous system when the inventive method is performed is, after addition of the suitable dosage form or formulation to the aqueous system, generally in the range from 0.5 to 800 ppm, preferably in the range from 2 to 500 ppm. The pH of the formulation before addition to the aqueous system is preferably in the basic range, but can also be in the acidic range, while the pH of the thickened aqueous system is in the acidic, neutral, or else basic range. In particular, the pH of the thickened aqueous system is in the range from 7 to 10.

Chemical water treatment influences the thickening-limiting factors to the extent that a higher thickening is possible than in the untreated water. The greatest effect is achieved by the inventive method, depending on the specific application, frequently with a TF from 1.1 to 8, preferably with a TF in the range from 1.5 to 8, particularly preferably with a TF of 2 to 5, in particular with a TF in the range from 3 to 5. At a high TF, the efficiency of the method no longer increases so greatly with the increase in TF. Since a TF greater than 10 is accompanied by scarcely any further water savings, and frequently dirt particles introduced need to be ejected, this value is generally scarcely exceeded.

Particularly silicate-comprising aqueous systems having a high TF which is uncontrolled are frequently triggers of problems whose causes at first do not apparently seem directly linked to the deposits. For example, heat exchangers coated with silicate layers remove the energy only inadequately. This leads to overheating of machinery and units. The use of the inventive method leads to a reduction in the silicate coating, for example in heat exchangers, and thereby prevents the overheating. The reduction achieved by means of the inventive method can vary in broad limits. This depends, for example, on the flow rate, the temperature or the residence time. The reduction due to the inventive method can be from 20 to 90%, compared with the process without control of TF. The service lives of the aqueous system thereby increase several times in plants in which silicates are the thickening-limiting factor. In particular, service life extensions by the factor of 2 to 5 are achieved.

The reduction in silicate coating by controlling the TF in addition leads, by use of the inventive method, to an improved action of the corrosion inhibitors present in the formulation for chemical water treatment. Corrosion inhibitors frequently no longer reach the surfaces of the plant parts if it is covered by a silicate layer. Massive corrosion processes take place below the layer which do not become visible until corrosion damage is present. Like corrosion inhibitors, biocides may also scarcely reach the sources of microbial infection which lie below deposits. Treatment with products for biological control is then unsuccessful, because the circulation is always "reinfected" after completion of the treatment. By controlling the TF, therefore a more efficient and more effective use of biocides is possible. The amount of biocides used can be significantly decreased. In particular, a reduction of the amount of biocide by up to 30% is frequently possible. In all applications, controlling the biological growth in the plants can be an important factor, in particular if contamination of humans by contact with the aqueous system or in cleaning of the plants is to be feared.

Plants which profit from a controlled increase in the TF according to the inventive method in aqueous systems which comprise silicates are, for example, plants whose function is essentially based on thermal effects in the aqueous system or depends on thermal effects in the aqueous system. Examples are cooling systems, such as open or closed cooling water circuits; heating systems, such as continuous-flow heaters, boilers, heating kettles; heat exchangers; water desalination plants or air humidifiers. In these systems, a continuous tendency to increase the TF is caused by evaporation of water. For example, by controlling an increased TF in accordance with the inventive method the range may be extended in which stable and efficient operation of a heat exchanger is ensured. Even in the case of an increased TF, the inventive method prevents the deposit of silicate coatings on the heat exchanger which would otherwise lead to a reduced heat transfer. In addition, plants which in the broadest sense are based on filtration systems operate more efficiently using the inventive method. Examples are water desalination plants, reverse osmosis (RO) systems, hyper- and nanofiltration plants and dialysis apparatuses in medical technology. Filtration operations may be carried out more efficiently by the inventive method even in the case of a higher TF, since stabilization of the aqueous system acts against the formation of solid coatings which plug or destroy the filter. The inventive method is likewise of interest for use in domestic appliances, for example in washing machines or dishwashing machines, since in the corresponding cleaning agents silicates, also as zeolites, are frequently present. Here, water savings may be made, with simultaneous avoidance of silicate coatings on laundry or dishes.

In addition, controlling the TF by the inventive method plays a role in geothermal processes for generating electricity or heat, in processes in oil extraction, sugar manufacture or paper manufacture. All of these methods have in common the fact that enormous amounts of water having many additives are used. The water used is frequently highly heated in some steps of these methods. This heating leads to evaporation of the water and to an increase in the TF. If the increase in the TF proceeds in an uncontrolled manner, increased deposits occur, in particular of silicates in the plants, which can be removed only by shutdown and cleaning. This uncontrolled increase in TF is avoided by the inventive method.

For example, in processes of oil extraction, large amounts of water are pumped under pressure through silicate-comprising rock, and as a result the water takes up large amounts of silicates which, uncontrolled, in later process steps can form coatings in piping which lead to blockage and pressure drop. By means of the controlled increase in TF, the inventive method suppresses in particular the formation of silicate coatings and thus avoids blockage and pressure drop in the piping.

In paper manufacture, the inventive method can be used, for example, in bleaching pulp. As chlorine-free bleaches, use is frequently made of peroxides, such as hydrogen peroxide ($H_2O_2$) or sodium peroxide ($Na_2O_2$). Peroxide bleaches are used, inter alia, for bleaching chemical pulp or mechanical pulp. Likewise, peroxide bleaches are used in the removal of printing inks present in scrap paper (deinking). Peroxides can readily decompose in an undesired manner, in particular under the catalytic activity of heavy metals. Inter alia, heavy metals such as manganese are especially present in mechanical pulp. Another source of heavy metals is the processing plants. Therefore, in addition to, or alternatively to, complexing agents, such as DTPA (diethylenetriaminepentaacetic acid) or EDTA (ethylenediaminetetraacetic acid), use is made of waterglass for stabilizing the peroxides. Waterglass is a soluble sodium silicate. In addition, the compounds of polyvalent cations, such as magnesium compounds, act advantageously on the stability of peroxide bleaches. Despite this stability-endangering combination of silicates and polyvalent cations, such as, for example, magnesium, which have a tendency to form silicate coatings, such as, for example, magnesium silicate, the inventive method permits control of the TF in paper manufacture within a preset range. This ensures the stable operation of plants even at relatively high silicate concentrations and concentrations of polyvalent cations, such as magnesium.

For economic and ecological reasons, precisely in the case of relatively large technical plants, recourse is frequently made to groundwater or surface water as an inexpensive alternative to drinking water. Depending on the origin of the water, greater or lesser amounts of dissolved components are present which accumulate in the water during the thickening process. The non-problematic components present in non-concentrated water in natural concentration can lead to very serious technical problems when they are present in highly concentrated form and thus the TF becomes too large. The inventive method permits control of the TF even when silicate-rich groundwater or surface water having a silicate content from $10^{-4}$ to $10^{-2}$ mol/l of Si, for example having a content of from $10^{-3}$ to $10^{-2}$ mol/l of Si is used.

Particularly advantageously, the inventive method is used in the operation of cooling towers which remove heat by evaporation of water. The mode of operation of a cooling tower is characterized by the water to be cooled being trickled through a distribution system with nozzles from the top via cooling tower internals which generate a large water surface area. Cooling air flows through the water as it is trickling down, and heat of evaporation is given off to the air via the evaporation process. The water is cooled in correspondence with the energy removal. The predominant cooling power is generally more than 85% recovered only from the energy required for the evaporation process. In practical operation of, for example, cooling towers, in most cases natural water which is not specially processed is used. Evaporation causes a thickening of the remaining water. By use of the inventive method, in particular unwanted silicate coatings are suppressed in the various parts of the plant, such as, for example, the abovementioned nozzles, which otherwise would occur with advancing evaporation. For example, by means of the inventive method, the silicate coatings are avoided in the piping or the evaporators which would otherwise lead to blockages or reduced heat transfer. Using the inventive method, a higher TF may be achieved at which stability of the thickened system against the formation of unwanted silicate coatings exist. The need for additional water requirement is lowered in accordance with the higher permitted TF.

A further embodiment of the inventive method is controlling the thickening in evaporative coolers. Systems designated evaporative coolers are customarily, especially open cooling towers, but also similar systems, for example trickle-flow or premoistened air coolers, and also hybrid cooling towers as a combination of evaporative cooling towers with air coolers.

An open cooling circuit can be thickened only up to a technically rational upper limit. Above this limit faults or damage of the cooling plant occur. A salt purge valve, triggered automatically as far as possible, ensures a short-time water exchange when the upper limit value for the maximum possible thickening is exceeded, in this case salt purge water is let off via the salt purge valve from the aqueous system and additional water is fed to the aqueous system. By using the inventive method, by controlling the TF in the range from 1.1 to 8, preferably in the range from 2 to 5, the lowest possible volume of salt purge water is achieved.

Other advantageous actions of the inventive method are the optimum water trickling in the cooling tower due to combating biological growth and in combination with the use of biocides, the protection of people against pathogenic microbes in the spray water by biological control.

In particular, the inventive method can also be used in the operation of reverse osmosis (RO) systems. If in a system, solutions of differing concentrations, e.g. aqueous systems of differing salt contents, are separated by a semipermeable membrane, the more highly concentrated solution seeks to be diluted. Water molecules pass through the membrane into the concentrated solution, the volume of which increases thereby. This process, termed osmosis, lasts until osmotic equilibrium is reached. Osmotic equilibrium is a dynamic equilibrium between the dilution tendency on the one hand and the hydrostatic pressure owing to the volume enlargement on the other. This hydrostatic overpressure corresponds here to the difference in osmotic pressures of the differently concentrated solutions and is essentially dependent on the concentration of the substances dissolved in the liquid. In the method of reverse osmosis, the direction of this natural osmotic flow is reversed. A pressure is applied to the untreated water which pressure is situated on one side of a semipermeable membrane which is only permeable to water. Since this pressure is significantly higher than the osmotic pressure difference, the water molecules pass through the semipermeable membrane from the side of the higher salt concentration to the side of the lower concentration. RO is a method for obtaining deionized (DI) water, in addition to distillation and ion exchange. Depending on the method, in an RO system, in addition to the DI water, the concentrated untreated water also occurs having a TF which can vary within a wide range. For example, the TF is in the range from 1.1 to 8, in particular in the range from 1.1 to 5.

Use of the inventive method in RO systems prevents the uncontrolled thickening of the untreated water and reduces thereby the deposits on the membrane which would block this and endanger the continuous operation of the plant. To protect the membrane against blockage, if appropriate a pretreatment of the untreated water can be carried out. The pretreatment depends on the quality of the untreated water. This pretreatment can be performed by technical measures, for example filtration, or softening. In addition to the water hardness (carbonate hardness), silicates play an important role in blockage of the membrane. The selection of a suitable formulation must be made very carefully. The compatibility with the membranes present must be ensured. By means of the inventive method, the expenditure on pretreatment of the untreated water may be reduced. By saving of other compounds for the chemical pretreatment of the untreated water, the selection of a suitable formulation is facilitated for the respective membrane.

Alternatively, or in combination with technical measures, the inventive method is available for controlling the TF in aqueous systems which comprise in particular silicates, for any desired plants. The stability of thickened aqueous systems against the precipitation of dissolved substances which lead to deposits or encrustations is increased by the inventive method. The inventive method achieves water savings, the biological growth in aqueous systems is controlled, and also the immobilization of sludges and silt is facilitated. The amounts of biocides and corrosion agents may be reduced with the same efficiency in the chemical water treatment. In addition, the inventive method makes it possible to keep thickening in the technically required range over a long service life. The copolymers used in the inventive method, owing to the partially neutralized production method, have a very low residual content of monomers.

EXAMPLES

Magnesium Silicate Inhibition

The increased silicate concentration in the aqueous system (magnesium silicate inhibition) was determined by means of turbidity titration.

| Reagents: | |
|---|---|
| Test solution A: | 9.06 g/l $Na_2SiO_3 \cdot 5H_2O$ |
| Test solution B: | 12.55 g/l $MgCl_2 \cdot 6H_2O$ |
| Sodium hydroxide solution: | 0.2 mol/l |
| Hydrochloric acid: | 0.5 mol/l |

Procedure: The corresponding amount of copolymer calculated on solid weight (SW) was weighed directly into the titration vessel. Subsequently, 50 ml of test solution A and 48 ml of deionized water were added. The pH of the titration solution was set to approximately pH 10 by HCl 0.5 mol/l or NaOH 0.25 mol/l. The pH was kept constant during the titration. Titration was performed with test solution B at intervals each of 0.25 ml, incrementally until turbidity remained. At a max. 75% transmission or a consumption>10 ml, the titration was automatically terminated. Each copolymer was measured twice.

The $SiO_2$ content was calculated in accordance with:

$$\beta(SiO_2) = \frac{V(MgCl_2) \cdot \beta(MgCl_2) \cdot M(SiO_2)}{M(Mg) \cdot V(Sample)}$$

$$\beta(SiO_2) = \frac{X \text{ mL} \cdot 1.5 \text{ mg/mL} \cdot 60.09 \text{ g/mol}}{24.3 \text{ g/mol} \cdot 0.05 \text{ L}} \text{ in } \frac{\text{mg}}{\text{L}}$$

The error limit is: max.+/−5%.

The Mw values are determined using gel-permeation chromatography (GPC). The GPC is calibrated using a widely distributed Na-PAA mixture whose integral molecular weight distribution curve is determined by SEC laser light scattering coupling by the calibration method of M. J. R. Cantow et al. (J. Polym. Sci., A-1, 5 (1967)1391-1394), but without the concentration correction proposed there.

The K values were measured in accordance with H. Fikentscher, Cellulose-Chemie [Cellulose Chemistry], volume 13, pp. 58-64 and 71-74 (1932) in a 1% strength by weight aqueous solution at 25° C. with uncorrected pH.

Example 1

Copolymers Comprising Maleic Acid

The copolymers are characterized by their composition, their molecular weight Mw and the K value. The degree of magnesium silicate inhibition is given by the $\beta(SiO_2)$ value, higher $\beta(SiO_2)$ values correspond to an improved activity.

Test Results:

| Sample | Copolymer | Dosage [ppm SW] | Mw [g/mol] | K value | β(SiO$_2$) [mg/l] |
|---|---|---|---|---|---|
| 0 value | — | 0 | — | — | 262 |
| 1 | AA/ITA/VPA 70/26/4% by wt. | 400 | 15 200 | 15.2 | 418 |
| 0 value | — | 0 | — | — | 262 |
| 1* | AA/MA/VPA 73/24/3% by wt. | 400 | 61 000 | 27.4 | 480 |
| 2 | AA/MA/VPA 71/24/5% by wt. | 400 | 26 400 | 21 | 512 |

ITA: itaconic acid, AA: acrylic acid, VPA: vinylpnosphonic acid MA: maleic acid (used as anhydride), AA: acrylic acid, VPA: vinylphosphonic acid,
*comparative example Example 2

Comparison with Commercial Products

The copolymers are characterized by their composition, their molecular weight Mw and the K value. The degree of magnesium silicate inhibition is given by the β(SiO$_2$) value, higher β(SiO$_2$) values correspond to an improved activity. The dosage of the copolymers is in all cases 400 ppm SW. For determination of the null value (0 value), no copolymer is used.
Test Results:

| Sample | Copolymer | Mw [g/mol] | K value | β(SiO$_2$) [mg/l] |
|---|---|---|---|---|
| 0 value | | — | — | 273 |
| 1 | AA/MA/VPA 71/24/5% by wt. | 26 400 | 21.3 | 532 |
| 2 | AA/MA/VPA 68/23/9% by wt. | 27 000 | 20.9 | 565 |
| 3 | AA/MA/VPA 65/22/13% by wt. | 20 300 | 19.7 | 542 |
| 4 | AA/MA/VPA 62/21/17% by wt. | 18 100 | 18.8 | 588 |
| 5 | AA/MA/VPA 60/20/20% by wt. | 20 300 | 19.4 | 572 |
| 6 | AA/MA/VPA 68/23/9% by wt. | 12 200 | 15.3 | 479 |
| Accumer ® 3100 | Modified polycarboxylate | — | — | 369 |
| Accumer ® 5000 | Modified polycarboxylate | 8900 | — | 357 |
| Goddrite ® K-XP-212 | Modified polycarboxylate | 7600 | — | 314 |
| Versaflex ® Si | Modified polycarboxylate | 6400 | — | 377 |
| Versaflex ® One | Modified polycarboxylate | — | — | 395 |

ITA: itaconic acid, AA: acrylic acid, VPA: vinylphosphonic acid, MA: maleic acid (used as anhydride)
Accumer ®, Goddrite ® and Versaflex ® are registered trade marks of Rohm & Haas, Noveon and Nalco.

The invention claimed is:

1. A method of reverse-osmosis, comprising:
adding at least one copolymer having a mean molecular weight Mw of at least 3000 g/mol to at most 60 000 g/mol and a random structure, the at least one copolymer comprising:
(A) 20 to 99.98% by weight of at least one monoethylenically unsaturated monocarboxylic acid;
(B) 0.01 to 70% by weight of at least one monoethylenically unsaturated dicarboxylic acid of selected from the group consisting of maleic acid, itaconic acid, hydrolyzable derivatives thereof and mixtures thereof; and also
(C) 0.01 to 40% by weight of at least one further ethylenically unsaturated comonomer different from (A) and (B) and selected from the group vinyl phosphonic acid and hydrolyzable groups thereof,
wherein a polymerization for producing the copolymer is performed in the presence of 0.01 to 100 mol % of at least one base, based on a total amount of all COOH groups of the monocarboxylic and dicarboxylic acids, the quantities in % by weight given in each case being based on a total amount of all monomers,
to treated or untreated water, to give an aqueous solution comprising the at least one copolymer; then
subjecting the aqueous solution to reverse-osmosis.
2. The method of claim 1, wherein an amount of copolymer present after the adding is in a range of 0.5 to 800 ppm.
3. The method of claim 1, wherein, the pH of the aqueous solution is in a range of 7 to 10.
4. The method of claim 1, wherein a thickening factor of the aqueous solution is in a range of 1.1 to 8.
5. The method of claim 1, further comprising pretreating the water before the adding.
6. The method of claim 1, wherein the water comprises at least one silicate or biocide.
7. The method of claim 1, wherein (A) comprises one or more members selected from the group consisting acrylic acid and methacrylic acid.
8. The method of claim 1, wherein (A) is acrylic acid.
9. The method of claim 1, wherein (B) comprises maleic acid.
10. The method of claim 1, wherein (B) comprises itaconic acid.
11. The method of claim 1, wherein (B) comprises maleic anhydride.
12. The method of claim 1, wherein (C) comprises vinyl phosphoric acid.
13. A method of treating an aqueous solution by reverse-osmosis, comprising:
subjecting to reverse-osmosis an aqueous solution containing adding at least one copolymer having a mean molecular weight Mw of at least 3000 g/mol to at most 60 000 g/mol and a random structure, wherein the copolymer comprises:
(A) 20 to 99.98% by weight of at least one monoethylenically unsaturated monocarboxylic acid;
(B) 0.01 to 70% by weight of at least one monoethylenically unsaturated dicarboxylic acid of selected from the group consisting of maleic acid, itaconic acid, hydrolyzable derivatives thereof and mixtures thereof; and
(C) 0.01 to 40% by weight of at least one further ethylenically unsaturated comonomer different from (A) and (B) and selected from the group vinyl phosphonic acid and hydrolyzable groups thereof.
14. The method of claim 13, wherein an amount of copolymer in the aqueous solution is 0.5 to 800 ppm.
15. The method of claim 13, wherein, the pH of the aqueous solution is 7 to 10.
16. The method of claim 13, wherein a thickening factor of the aqueous solution is in a range of 1.1 to 8.
17. The method of claim 13, wherein (A) comprises one or more members selected from the group consisting acrylic acid and methacrylic acid.
18. The method of claim 13, wherein (B) comprises maleic acid, itaconic or a mixture thereof acid.
19. The method of claim 13, wherein (B) comprises maleic anhydride.
20. The method of claim 13, wherein (C) comprises vinyl phosphoric acid.

* * * * *